(12) United States Patent
McCamy et al.

(10) Patent No.: US 12,360,427 B2
(45) Date of Patent: *Jul. 15, 2025

(54) SEAL FOR ELECTROCHROMIC DEVICE

(71) Applicant: Vitro Flat Glass LLC, Cheswick, PA (US)

(72) Inventors: James W. McCamy, Export, PA (US); Ashtosh P. Ganjoo, Allison Park, PA (US); Roxana Shabani, San Diego, CA (US)

(73) Assignee: Vitro Flat Glass LLC, Cheswick, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/544,599

(22) Filed: Dec. 19, 2023

(65) Prior Publication Data

US 2024/0152018 A1 May 9, 2024

Related U.S. Application Data

(62) Division of application No. 17/500,995, filed on Oct. 14, 2021, now Pat. No. 11,852,945.

(Continued)

(51) Int. Cl.
*G02F 1/161* (2006.01)
*C03C 4/02* (2006.01)
*G02F 1/1523* (2019.01)

(52) U.S. Cl.
CPC ............ *G02F 1/161* (2013.01); *G02F 1/1523* (2013.01); *C03C 4/02* (2013.01)

(58) Field of Classification Search
CPC .......... G02F 1/161; G02F 1/1523; C03C 4/02

(Continued)

(56) References Cited

U.S. PATENT DOCUMENTS

| 4,193,236 A | 3/1980 | Mazzoni et al. |
| 4,464,874 A | 8/1984 | Shea, Jr. et al. |

(Continued)

FOREIGN PATENT DOCUMENTS

| CN | 102540612 B | 6/2014 |
| CN | 105074548 A | 11/2015 |

(Continued)

OTHER PUBLICATIONS

Torayfan® CBS2 Product Data Sheet (Year: 2021).
Torayfan® PWX5 Product Data Sheet (Year: 2021).

*Primary Examiner* — George G. King
(74) *Attorney, Agent, or Firm* — The Webb Law Firm

(57) ABSTRACT

An electrochromic article includes a first substrate having a first surface and an opposite second surface and a second substrate having a third surface and an opposite fourth surface separated from the first substrate. The second surface of the first substrate faces the third surface of the second substrate and a first electrode is positioned over at least a portion of the second surface of the first substrate. A second electrode is positioned over at least a portion of the third surface of the second substrate. A sealant material is positioned between the first electrode and second electrode. An electrochromic composition is positioned in direct contact with at least a portion of the first electrode and at least a portion of the second electrode. The sealant material is formed from an organic polymer material having an oxygen transmission rate (OTR) of less than or equal to 2 cc/m²·day·atm.

6 Claims, 3 Drawing Sheets

Related U.S. Application Data

(60) Provisional application No. 63/091,683, filed on Oct. 14, 2020.

(58) Field of Classification Search
USPC .................................................. 359/267.272
See application file for complete search history.

(56) References Cited

U.S. PATENT DOCUMENTS

| | | |
|---|---|---|
| 4,466,562 A | 8/1984 | DeTorre |
| 4,671,155 A | 6/1987 | Goldinger |
| 4,746,347 A | 5/1988 | Sensi |
| 4,792,536 A | 12/1988 | Pecoraro et al. |
| 5,030,593 A | 7/1991 | Heithoff |
| 5,030,594 A | 7/1991 | Heithoff |
| 5,088,258 A | 2/1992 | Schield et al. |
| 5,106,663 A | 4/1992 | Box |
| 5,240,886 A | 8/1993 | Gulotta et al. |
| 5,385,872 A | 1/1995 | Gulotta et al. |
| 5,393,593 A | 2/1995 | Gulotta et al. |
| 6,057,956 A | 5/2000 | Ash et al. |
| 6,671,080 B2 | 12/2003 | Poll et al. |
| 6,747,779 B1 | 6/2004 | Morin et al. |
| 7,265,889 B2 | 9/2007 | Morin et al. |
| 7,511,872 B2 | 3/2009 | Tonar et al. |
| 7,586,664 B2 | 9/2009 | O'Shaughnessy |
| 9,341,015 B2 | 5/2016 | Fernando et al. |
| 10,962,857 B2 | 3/2021 | Giron et al. |
| 2006/0028730 A1 | 2/2006 | Varaprasad et al. |
| 2007/0002420 A1 | 1/2007 | Rukavina |
| 2012/0026573 A1 | 2/2012 | Collins et al. |
| 2012/0327499 A1 | 12/2012 | Parker et al. |
| 2019/0033677 A1 | 1/2019 | Letocart et al. |
| 2019/0049809 A1 | 2/2019 | Oyama et al. |
| 2019/0324341 A1 | 10/2019 | Tonar et al. |

FOREIGN PATENT DOCUMENTS

| | | |
|---|---|---|
| CN | 110869845 A | 3/2020 |
| JP | S5685735 A | 7/1981 |
| KR | 101586457 B1 | 1/2016 |
| WO | 2019241264 A2 | 12/2019 |

SEAL FOR ELECTROCHROMIC DEVICE

CROSS-REFERENCE TO RELATED APPLICATION

This application is a divisional of U.S. patent application Ser. No. 17/500,995, filed on Oct. 14, 2021, which is entitled to and claims priority to U.S. Provisional Application No. 63/091,683, filed on Oct. 14, 2020, the disclosures of which in each case are incorporated herein by reference in their entireties.

BACKGROUND OF THE INVENTION

Field of the Invention

This invention relates to a transparent electrochromic device, and more particularly, to a transparent electrochromic device having a single sealant material.

Description of Related Art

Electrochromic switchable transparencies are often used when it is desired to vary visible light transmission through a transparency or glazing. For example and not limiting to the discussion, switchable transparencies may be used for building transparencies to provide a user with the ability to increase or decrease the visible light transmittance of the transparency. In the case of fully autonomous vehicles, one can envision electrochromic switchable transparencies used as a windshield.

One type of an electrochromic transparency or system includes an electrochromic composition having anodic compounds and cathodic compounds together between a pair of spaced electrode assemblies. The electrode assembly in one arrangement includes an electrode mounted on the surface of a glass sheet. A pair of the electrode assemblies is mounted in spaced relationship to one another with the electrodes in facing relationship with one another and in electrical contact with the electrochromic composition between the electrodes.

The electrochromic composition between the two electrode assemblies is held in place and isolated from the ambient using more than one sealant material. Electrochromic transparencies typically utilize a mechanical barrier in contact with the electrochromic composition to hold the electrochromic position in place and a permeability barrier in contact with the mechanical barrier to keep moisture and oxygen away from the electrochromic composition.

As can be appreciated, it would be advantageous to provide a single sealant material that serves as both a mechanical barrier and a permeability barrier, in an electrochromic transparency.

SUMMARY OF THE INVENTION

The invention relates to an electrochromic article. The electrochromic article comprises a first substrate having a first surface and an opposite second surface and a second substrate having a third surface and an opposite fourth surface separated from the first substrate. The second surface of the first substrate faces the third surface of the second substrate. A first electrode is positioned over at least a portion of the second surface of the first substrate. A second electrode is positioned over at least a portion of the third surface of the second substrate, where the first electrode is separated from the second electrode. A sealant material is positioned between the first electrode and second electrode. An electrochromic composition is positioned in direct contact with at least a portion of the first electrode and at least a portion of the second electrode. The sealant material is formed from an organic polymer material having an oxygen transmission rate (OTR) of less than or equal to 2 cubic centimeters per square meter day atmosphere (cc/$m^2 \cdot day \cdot atm$).

The present invention also relates to a method of preparing an electrochromic article. A first substrate having a first surface and an opposite second surface is provided. A first electrode is positioned over at least a portion of the second surface of the first substrate. A sealant material is applied in direct contact with at least a portion of the first electrode. An electrochromic composition is applied in direct contact with at least a portion of the first electrode and in direct contact with at least a portion of the sealant material. A second substrate having a third surface and an opposite fourth surface is provided. A second electrode is positioned over at least a portion of the third surface of the second substrate. The first substrate comprising the first electrode, the sealant material, and the electrochromic composition is contacted with the second substrate comprising the second electrode such that the second electrode is in direct contact with at least a portion of the sealant material and at least a portion of the electrochromic material. Pressure and heat are applied to form the electrochromic article. The sealant material is formed from an organic polymer material having an oxygen transmission rate (OTR) of less than or equal to 2 cubic centimeters per square meter day atmosphere (cc/$m^2 \cdot day \cdot atm$).

The invention relates to an insulated glass unit. The insulated glass unit comprises a modified first ply. The modified first ply comprises a first substrate having a first surface and an opposite second surface and a second substrate having a third surface and an opposite fourth surface separated from the first substrate. The second surface of the first substrate faces the third surface of the second substrate. A first electrode is positioned over at least a portion of the second surface of the first substrate. A second electrode is positioned over at least a portion of the third surface of the second substrate, where the first electrode is separated from the second electrode. A sealant material is positioned between the first electrode and second electrode. An electrochromic composition is positioned in direct contact with at least a portion of the first electrode and at least a portion of the second electrode. The sealant material is formed from an organic polymer material having an oxygen transmission rate (OTR) of less than or equal to 2 cubic centimeters per square meter day atmosphere (cc/$m^2 \cdot day \cdot atm$). The insulated glass unit comprise a second ply comprising a No. 3 surface and a No. 4 surface. The second ply is spaced from the first modified ply and the first modified ply and the second ply are connected together.

DESCRIPTION OF THE INVENTION

Figure 1A:
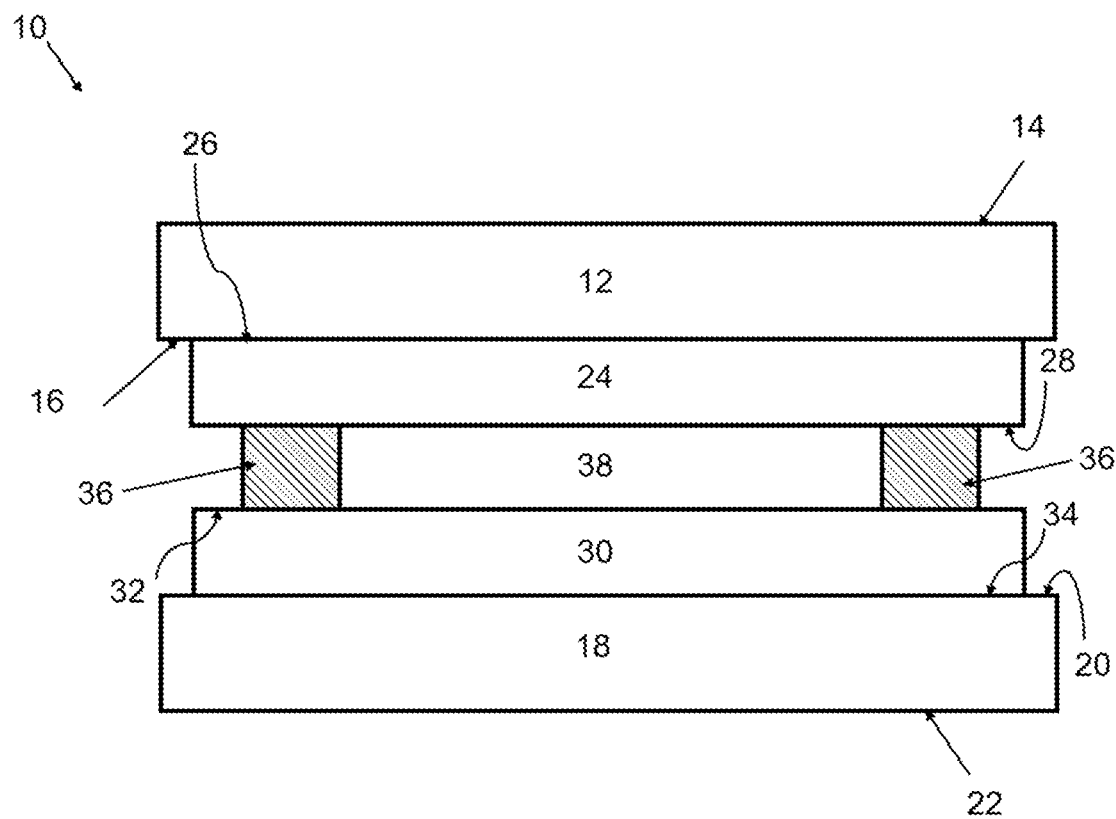
FIG. 1A is a sectional view (not to scale) of an electrochromic article according to an example of the invention.

As used herein, spatial or directional terms, such as "left", "right", "inner", "outer", "above", "below", and the like, relate to the invention as it is shown in the drawing figures. However, it is to be understood that the invention can assume various alternative orientations and, accordingly, such terms are not to be considered as limiting. Further, as used herein, all numbers expressing dimensions, physical characteristics, processing parameters, quantities of ingredients, reaction conditions, and the like, used in the specification and claims are to be understood as being modified in all instances by the term "about". Accordingly, unless indicated to the contrary, the numerical values set forth in the following specification and claims may vary depending upon the desired properties sought to be obtained by the present invention. At the very least, and not as an attempt to limit the application of the doctrine of equivalents to the scope of the claims, each numerical value should at least be construed in light of the number of reported significant digits and by applying ordinary rounding techniques. Moreover, all ranges disclosed herein are to be understood to encompass the beginning and ending range values and any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 1 to 3.3, 4.7 to 7.5, 5.5 to 10, and the like. "A" or "an" refers to one or more.

Further, as used herein, the terms "formed over", "deposited over", or "provided over" mean formed, deposited, or provided on but not necessarily in contact with the surface. For example, a coating layer "formed over" a substrate does not preclude the presence of one or more other coating layers or films of the same or different composition located between the formed coating layer and the substrate. Additionally, all documents, such as, but not limited to, issued patents and patent applications, referred to herein are to be considered to be "incorporated by reference" in their entirety. As used herein, the term "film" refers to a coating region of a desired or selected coating composition. A "layer" can comprise one or more "films", and a "coating" or "coating stack" can comprise one or more "layers". The term "asymmetrical reflectivity" means that the visible light reflectance of the coating from one side is different than that of the coating from the opposite side.

For purposes of the following discussion, the electrochromic articles described herein may be discussed with reference to use with an architectural transparency, such as, but not limited to, an insulating glass unit (IGU). As used herein, the term "architectural transparency" refers to any transparency located on a building, such as, but not limited to, windows and sky lights. However, it is to be understood that the electrochromic articles described herein are not limited to use with such architectural transparencies but, could be practiced with transparencies in any desired field, such as, but not limited to, laminated or non-laminated residential and/or commercial windows, insulating glass units, and/or transparencies for land, air, space, above water and underwater vehicles, such as, autonomous vehicles. Therefore, it is to be understood that the specifically disclosed exemplary aspects or embodiments are presented simply to explain the general concepts of the invention, and that the invention is not limited to these specific exemplary embodiments. Additionally, while a typical "transparency" can have sufficient visible light transmission such that materials can be viewed through the transparency, the "transparency" need not be transparent to visible light but may be translucent or opaque. That is, by "transparent" is meant having visible light transmission of greater than 0% up to 100%.

A non-limiting electrochromic article 10 incorporating features of the invention is illustrated in FIG. 1A. The electrochromic article 10 comprises a first substrate 12 having a first surface 14 and an opposite second surface 16 and a second substrate 18 having a third surface 20 and an opposite fourth surface 22 separated from the first substrate 12. The second surface 16 of the first substrate 12 faces the third surface 20 of the second substrate 18. A first electrode 24 is positioned over at least a portion of the second surface 16 of the first substrate 12. A second electrode 30 is positioned over at least a portion of the third surface 20 of the second substrate 18, where the first electrode 24 is separated from the second electrode 30. A sealant material 36 is positioned between the first electrode 24 and second electrode 30. An electrochromic composition 38 is positioned in direct contact with at least a portion of the first electrode 24 and at least a portion of the second electrode 30. As further shown in FIG. 1A, the electrochromic composition 38 is contained by the first electrode 24, the second electrode 30, and the sealant material 36.

It is appreciated the electrochromic article 10 described herein can be used as a transparency. As such, the transparency can include a first substrate 12 with a first surface 14 (No. 1 surface) and an opposed second surface 16 (No. 2 surface). The electrochromic article 10 includes a second ply 18 with a first surface 20 (No. 3 surface) and an opposed second surface 22 (No. 4 surface). The first substrate 12 is separate from the second substrate 18. The No. 2 surface 14 of the first substrate 12 faces the No. 3 surface 20 of the second substrate 18. The electrochromic article 10 can have any desired visible light, infrared radiation, or ultraviolet radiation transmission and/or reflection.

In the illustrated non-limiting embodiment, the No. 1 surface 14 faces the exterior of a building, and, thus, is an outer surface, and the No. 2 surface 16 faces the interior of the building. In a non-limiting embodiment, the No. 3 surface 20 faces the exterior of a building, and, thus, is an outer surface, and the No. 4 surface 22 faces the interior of the building.

In the broad practice of the invention, the substrates 12, 18 of the electrochromic article 10 can be of the same or different materials. The substrates 12, 18 can include any desired material having any desired characteristics. For example, one or more of the substrates 12, 18 can be transparent or translucent to visible light. By "transparent" is meant having visible light transmission of greater than 0% up to 100%. Alternatively, one or more of the substrates 12, 18, can be translucent. By "translucent" is meant allowing electromagnetic energy (e.g., visible light) to pass through but, diffusing this energy such that objects on the side opposite the viewer are not clearly visible. Examples of suitable materials include, but are not limited to, plastic substrates (such as, acrylic polymers, such as, polyacrylates; polyalkylmethacrylates, such as, polymethylmethacrylates, polyethylmethacrylates, polypropylmethacrylates, and the like; polyurethanes; polycarbonates; polyalkylterephthalates, such as, polyethyleneterephthalate (PET), polypropyleneterephthalates, polybutyleneterephthalates, and the like; polysiloxane-containing polymers; or copolymers of any monomers for preparing these, or any mixtures thereof);

ceramic substrates; glass substrates; or mixtures or combinations of any of the above. For example, one or more of the substrates 12, 18 can include conventional soda-lime-silicate glass, borosilicate glass, or leaded glass. The glass can be clear glass. By "clear glass" is meant non-tinted or non-colored glass. Alternatively, the glass can be tinted or otherwise colored glass. The glass can be annealed or heat-treated glass. As used herein, the term "heat treated" means tempered or at least partially tempered. The glass can be of any type, such as, conventional float glass, and can be of any composition having any optical properties, e.g., any value of visible transmission, ultraviolet transmission, infrared transmission, and/or total solar energy transmission. By "float glass" is meant glass formed by a conventional float process in which molten glass is deposited onto a molten metal bath and controllably cooled to form a float glass ribbon. Examples of float glass processes are disclosed in U.S. Pat. Nos. 4,466,562 and 4,671,155.

The substrates 12, 18 can each comprise, for example, clear float glass or can be tinted or colored glass or one substrate 12, 18 can be clear glass and the other substrate 12, 18, colored glass. Although not limiting, examples of glass suitable for the first substrate 12 and/or second substrate 18 are described in U.S. Pat. Nos. 4,746,347; 4,792,536; 5,030,593; 5,030,594; 5,240,886; 5,385,872; and 5,393,593. The substrates 12, 18 can be of any desired dimensions, e.g., length, width, shape, or thickness. In one exemplary automotive transparency, the first and second plies can each be 1 mm to 10 mm thick, such as 1 mm to 8 mm thick, such as, 2 mm to 8 mm, such as, 3 mm to 7 mm, such as, 5 mm to 7 mm, such as, 6 mm thick, such as, 4 mm thick.

As previously described, the electrochromic article 10 comprises a first electrode 24. The first electrode 24 is positioned over at least a portion of the No. 2 surface 16 of the first substrate 12. The ends of the first substrate 12 can be extended further out than the first electrode 24. The first electrode 24 can have one or more connections (not shown) that can be made from one or more external circuits (not shown) such that an electrical current can pass through first electrode 24. Further, the first electrode 24 has a first surface 26 and a second surface 28. The first surface 26 of the first electrode 24 is supported on, and, preferably, securely mounted on, the No. 2 surface 16 of the first substrate 12. The first electrode 24 is transparent to visible light, when the electrochromic article 10 is in its "off", "uncolored", or "bleached" state. The first electrode 24 can be an anode or cathode. The first electrode 24 can comprise, but is not limited to, indium-doped tin oxide (ITO), fluorine-doped tin oxide (FTO), aluminum-doped zinc oxide (AZO), gallium-doped zinc oxide (GZO), indium-doped zinc oxide (IZO), doped silver, silver, mixtures thereof, or combinations thereof. The first electrode 24 can also contain one or more layers of dielectric materials, such as, oxides of titanium, hafnium, zirconium, niobium, zinc, bismuth, lead, indium, tin, aluminum, silicon and mixtures thereof, for durability or modification of the optical properties of the electrochromic article 10. The first electrode 24 can be deposited onto the second surface 16 of the first substrate 12 by conventional chemical vapor deposition (CVD) and/or physical vapor deposition (PVD) methods. Examples of CVD processes include spray pyrolysis. Examples of PVD processes include electron beam evaporation and vacuum sputtering (such as, magnetron sputter vapor deposition (MSVD)). Other coating methods could also be used, such as, but not limited to, wet precursor methods. The first electrode 24 can comprise one or a plurality of layers of above-mentioned materials. Although not limiting to the invention, the first electrode 24 can have a thickness in the range of 500 Angstroms (Å) to 10,000 Å, e.g. in the range of 950 Å to 3,000 Å or in the range of 950 Å to 2,000 Å.

Referring again to FIG. 1A, the electrochromic article 10 also comprises a second electrode 30. The second electrode 30 is positioned over at least a portion of the No. 3 surface 20 of the second substrate 18. The ends of the second substrate 18 can be extended out further than the second electrode 30. As shown in FIG. 1A, the first electrode 24 is separated from the second electrode 30. The second electrode 30 can have one or more connections (not shown) that can be made from one or more external circuits (not shown) such that an electrical current can pass through second electrode 30. Further, the second electrode 30 has a first surface 32 and a second surface 34. The first surface 32 of the second electrode 30 faces the second surface 28 of the first electrode. The second surface 34 of the second electrode 30 is supported on, and, preferably, securely mounted on, the No. 3 surface 20 of the second substrate 18. The second electrode 30 is transparent to visible light, when the electrochromic article 10 is in its "off", "uncolored", or "bleached" state. The second electrode 30 can be an anode or cathode. The second electrode 30 can comprise any of the materials described above with respect to the first electrode 24, such as, for example, ITO, FTO, AZO, GZO, IZO, doped silver, silver, mixtures thereof, or combinations thereof. The second electrode 30 can also have one or more layers of dielectric materials and can comprise any of the materials described above with respect to the first electrode 24, such as oxides of titanium, hafnium, zirconium, niobium, zinc, bismuth, lead, indium, tin, aluminum, silicon and mixtures thereof. The second electrode 30 can be deposited onto the first surface 20 of the second substrate 18 by the methods described above with respect to the first electrode 24. The second electrode 30 can comprise one or a plurality of layers of above-mentioned materials. The second electrode 30 can be formed from the same material(s) as the first electrode 24, or the second electrode 30 can be formed from material(s) that are different than the first electrode 30. Although not limiting to the invention, the second electrode 30 can have a thickness in the range of 500 Angstroms (Å) to 10,000 Å, e.g. in the range of 950 Å to 3,000 Å or in the range of 950 Å to 2,000 Å.

The electrochromic article 10 further comprises a sealant material 36 as previously noted. In one non-limiting embodiment, the sealant material 36 is the only sealant material in the electrochromic article 10. The sealant material 36 is positioned in between the first electrode 24 and the second electrode 30. The sealant material 36 can be in direct contact with the second surface 28 of the first electrode 24 and the first surface 32 of the second electrode 30. The edges of first electrode 24 can extend out further than the sealant material 36. Similarly, the edges of the second electrode 30 can also extend out further than the sealant material 36.

Figure 1B:
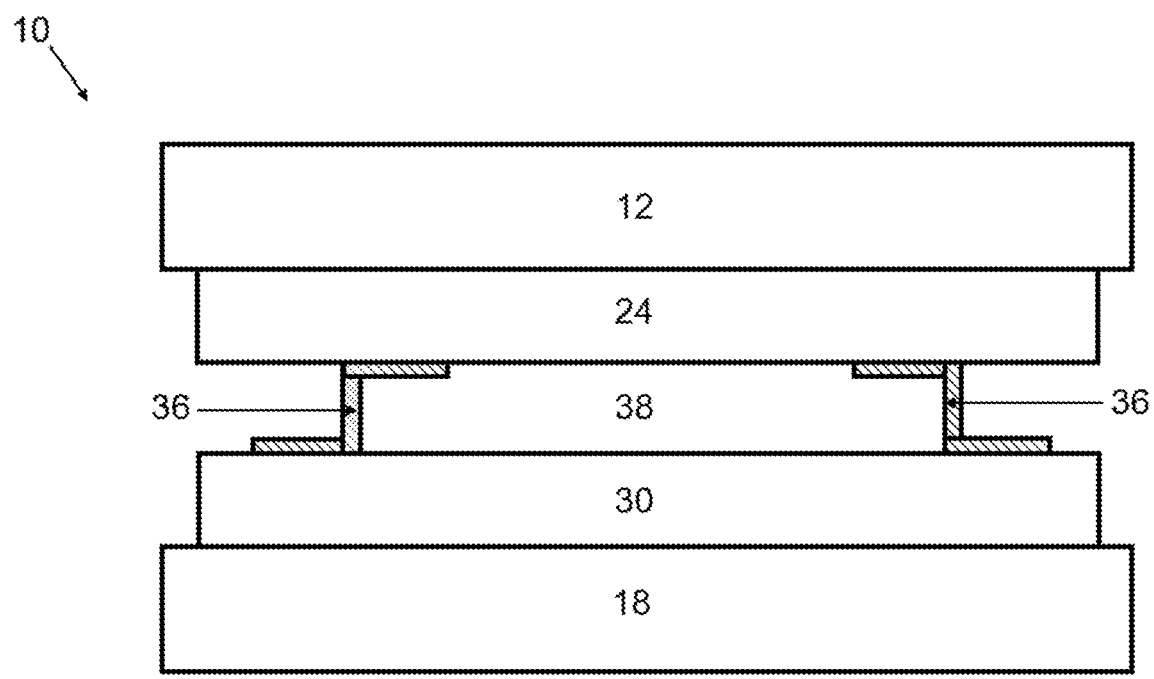
FIG. 1B is a sectional view (not to scale) of an electrochromic article according to an example of the invention.

The sealant material 36 can be applied in any shape suitable for the electrochromic article 10. In one non-limiting embodiment, the sealant material 36 is shaped like a frame to define the outer limits or boundary of the electrochromic composition 38, as depicted in FIG. 1A. In one non-limiting embodiment, the electrochromic composition 38 is applied inside the frame of sealant material 36. In one non-limiting embodiment, the sealant material 36 overlaps the electrochromic composition 38 in a step orientation, as depicted in FIG. 1B.

The sealant material 36 is adjacent to the electrochromic composition 38 and can be associated with each other in various configurations. For example, in one non-limiting embodiment, the sealant material 36 is in direct contact with the electrochromic composition 38. In another non-limiting embodiment, there is a gap with vacuum or inert gas present between the sealant material 36 and the electrochromic composition 38. Further, in one non-limiting embodiment, there is no additional material present between the sealant material 36 and the electrochromic composition 38. In one non-limiting embodiment, the sealant material 36 surrounds the electrochromic composition 38. In one non-limiting embodiment, the sealant material 36 overlaps the electrochromic composition 38. Moreover, in one non-limiting embodiment, the sealant material 36 is simultaneously in direct contact with at least a portion of the second surface 28 of the first electrode 24, at least a portion of the electrochromic composition 38, and at least a portion of the first surface 32 of the second electrode 30.

The sealant material 36 serves as both a mechanical barrier and permeability barrier. A suitable sealant material 36 for the electrochromic article 10 is a material that has good adhesion to the first and second substrates 12, 18 and/or the first and second electrodes 24, 30, low permeabilities for oxygen, moisture vapor, and other detrimental vapors and gases, is chemically inert with respect to the materials used to construct the electrochromic article 10, and is transparent. The sealant material 36 is meant to contain and protect the electrochromic composition 38. The sealant material 36 must not react with the electrochromic composition 38 to form an objectionable aesthetic. As used herein, "objectionable aesthetic" refers to discoloration or unwanted degradation in performance. The sealant material 36 is resistant to degradation by ultraviolet light.

The sealant material 36 is selected to have an oxygen transmission rate (OTR) less than or equal to 2 cubic centimeters per square meter day atmosphere (cc/$m^2 \cdot day \cdot atm$), such as less than or equal to 1 $cc/m^2 \cdot day \cdot atm$, or, such as, less than or equal to 0.5 $cc/m^2 \cdot day \cdot atm$. However, one of ordinary skill in the art would understand that a wider sealant material 36 would permit a higher OTR.

The one or more connections (not shown) to the first electrode 24 from the external circuit (not shown) can extend through the sealant material 36. The one or more connections (not shown) to the second electrode 30 from the external circuit (not shown) can extend through the sealant material 36.

The one or more connections (not shown) to the first electrode 24 from the external circuit (not shown) does not extend through the sealant material 36. The one or more connections (not shown) to the second electrode 30 from the external circuit (not shown) does not extend through the sealant material 36.

The sealant material 36 is selected to have a suitable glass transition temperature (Tg) or viscosity such that the sealant material 36 does not flow into the vision area of the electrochromic device, flow and mix with the electrochromic composition 38, or flow outwards past the edge of the glass.

The sealant material can be formed from one or more organic polymeric materials. As used herein, the term "resin" is used interchangeably with "polymer," and the term polymer refers to oligomers and homopolymers, copolymers, and graft polymers. The term "resin" is used interchangeably with "polymer". Homopolymers contain one type of building block, or monomer, whereas copolymers contain more than one type of monomer. An "oligomer" can be a polymer that comprises a small number of monomers, such as, for example, from 3 to 100 monomer residues.

The polymer can have various structures such as, in the form of a block polymer. A "block polymer" refers to a polymer comprising one or more homopolymeric subunits covalently linked to, or separated by, subunits of a different chemical nature or by a coupling group of low molecular weight. A block copolymer refers to a block polymer containing stretches of two or more different homopolymeric subunits linked in any topology.

A polymer "comprises" or is "derived from" a stated monomer if that monomer is incorporated into the polymer. Thus, the incorporated monomer that the polymer comprises is not the same as the monomer prior to incorporation into a polymer, in that at the very least, certain linking groups are incorporated into the polymer backbone or certain groups are removed in the polymerization process. A polymer is said to comprise a specific type of linkage if that linkage is present in the polymer. An incorporated monomer can be a "residue" of that monomer. A "macromer" or "macromonomer" refers to a monomeric subunit for incorporation into a copolymer, and can be a macromolecule that has at least one end-group which enables it to act as a monomer molecule. It may be a combination product of two or more smaller monomer residues.

As used herein, a "moiety" is a part of a molecule, and can include as a class "residues", which are the portion of a compound or monomer that remains in a larger molecule, such as, a polymer chain, after incorporation of that compound or monomer into the larger molecule, or "functional groups", which are specific substituents or moieties to which a characteristic chemical reactivity, non-covalent interactivity, physical characteristic, or other chemical or physical properties may be attributed.

The organic polymeric materials that are used for the sealant material can include a variety of thermosetting resins known in the art. As used herein, the term "thermosetting" refers to resins that "set" irreversibly upon curing or crosslinking, wherein polymer chains of polymeric components are joined together by covalent bonds. This property is usually associated with a cross-linking reaction of the composition constituents often induced, for example, by heat or radiation (e.g. UV radiation).

As indicated, the organic polymeric material can also include thermoplastic resins. As used herein, the term "thermoplastic" refers to resins that are not joined by covalent bonds and, thereby, can undergo liquid flow upon heating.

Non-limiting examples of suitable organic polymeric materials include (meth)acrylate resins, polyurethanes, polyolefins, polyesters, polysiloxanes, co-polymers thereof, and combinations thereof. As used herein, "(meth)acrylate" and like terms refers both to the acrylate and the corresponding methacrylate. The term "polyurethane" is for compound comprising a plurality of urethane linkages having the structure -urethane- and is typically formed from the reaction of polyisocyanates and polyols. Polyurethanes can also be poly(ureaurethane)(s) that are prepared from the reaction of polyisocyanates with polyols and water and/or amines and which may include additional linkages such as, urea linkages, for example. A "polyolefin" refers to a polymer formed from at least one olefinic monomer, such as, for example, alpha unsaturated $C_2$-$C_{32}$ alkenes. As used herein, "siloxane" is a compound having one or more Si—O—Si linkages, e.g.,

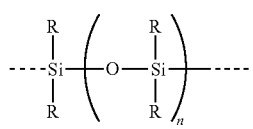

where each instance of R is, independently, an organic group or H, for example, straight or branched-chain $C_1$-$C_4$ alkyl, including methyl, ethyl, propyl, butyl, or phenyl $C_1$-$C_4$ alkyl, such as, phenylmethyl or phenylethyl, optionally substituted with one or more halogen (—F, —Cl, —Br, and/or —I) atoms. n typically varies from 1-2,000 with number average molecular weight (Mn) of, for example, about 1,000 to about 10,000, and increments therebetween. For polysiloxanes, n is greater than 1, e.g., from 10 to 200 or from 10 to 50.

The polymers that form the organic polymeric materials can comprise a linear, branched, or cyclic structure. The term "linear" refers to a compound having a straight hydrocarbon chain, the term "branched" refers to a compound having a hydrocarbon chain with a hydrogen replaced by a substituent such as, an alkyl group that branches or extends out from a straight chain, and the term "cyclic" refers to a closed ring structure. The polymers can also include aliphatic cyclic structures or aromatic cyclic structures. As used herein, an "aromatic group" refers to a cyclically conjugated hydrocarbon with a stability (due to delocalization) that is significantly greater than that of a hypothetical localized structure. Further, the term "aliphatic" refers to non-aromatic structures that contain saturated carbon bonds. The cyclic structures also encompass bridged ring polycycloalkyl groups (or bridged ring polycyclic groups) and fused ring polycycloalkyl groups (or fused ring polycyclic groups).

Further, the organic polymeric materials can have any of a variety of functional groups including, but not limited to, carboxylic acid groups, amine groups, hydroxyl groups, thiol groups, carbamate groups, amide groups, urea groups, isocyanate groups (including blocked isocyanate groups), and combinations thereof.

Thermosetting resins typically comprise a cross-linker that may be selected from any of the cross-linkers known in the art to react with the functionality of one or more resins. The sealant material 36 may therefore also include a cross-linker. As used herein, the term "cross-linker" refers to a molecule comprising two or more functional groups that are reactive with other functional groups and that is capable of linking two or more monomers or polymers through chemical bonds. Alternatively, or in addition to the above, the organic polymer materials can have functional groups that are reactive with themselves; in this manner, such resins are self-crosslinking.

In one non-limiting embodiment, the sealant material 36 is a (meth)acrylic-polyurethane copolymer. The sealant material 36 comprising the (meth)acrylic-polyurethane copolymer can be cured using ultraviolet radiation.

In one non-limiting example, the polyester for the sealant material 36 is polyethylene terephthalate (PET). In one non-limiting example, the PET is biaxially-oriented and commercially available as Mylar® M813.

In one non-limiting embodiment, the sealant material 36 comprises a polysiloxane. A non-limiting example of a suitable polysiloxane is Sylgard® 184. Sylgard® 184 is a silicone elastomer comprising a polydimethyl siloxane and an organically-modified silica (e.g., ORMOSIL). Sylgard® 184 is prepared by combining a base (Part A) with a curing agent (Part B). The base includes a siloxane (dimethylvinyl-terminated dimethyl siloxane) and an ORMOSIL (dimethylvinylated and trimethylated silica) in a solvent (ethyl benzene). The curing agent also includes a mixture of siloxanes and an ORMOSIL in a solvent, including: dimethyl, methylhydrogen siloxane; dimethylvinyl-terminated dimethyl siloxane; dimethylvinylated and trimethylated silica; tetramethyl tetravinyl cyclitetra siloxane; and ethyl benzene.

As used herein, the term "elastomer" refers to a polymeric material which at a temperature, such as, room temperature (e.g. 20° C.-30° C.), or physiological temperature (e.g., 35° C.-40° C.), is capable of repeatedly recovering in size and shape after removal of a deforming force. An elastomer may be a material which can be repeatedly stretched to at least 1.5×, at least 2×, or at least 3× its original length and will repeatedly return to its approximate original length on release of the stress.

In one non-limiting embodiment, the sealant material 36 is a non-epoxide based organic polymer material. As used herein "non-epoxide based" means an organic polymer having no epoxide functional groups or an insignificant amount of epoxide functional groups, such as, less than 1 weight percent (wt. %) of epoxide functional groups, such as, less than 0.5 wt. % of epoxide functional groups, or 0 wt. % of epoxide functional groups. In some non-limiting embodiments, the sealant material 36 comprises no epoxide functional groups. In some non-limiting embodiments, the sealant material 36 comprises an insignificant amount of epoxide functional groups, such that the epoxide functional groups do not contribute to reactivity with the electrochromic composition 38 to provide any undesirable effects (e.g. discoloration, such as, yellowing).

The electrochromic article 10 comprises an electrochromic composition 38. The electrochromic composition 38 can be any electrochromic composition well-known in the art, for example, an electrochromic solution, an electrochromic gel, an electrochromic semi-solid material, an electrochromic solid materials, and the like. The electrochromic composition 38 can be a solution-phase type electrochromic composition or a gel-type electrochromic composition in which a material contained in solution in an ionically conducting electrolyte remains in solution in the electrolyte when electrochemically reduced or oxidized. Alternatively, the electrochromic composition 38 can be an electrodeposition-type electrochromic composition, in which a material contained in solution in the ionically conducting electrolyte forms a layer on the electronically conducting electrode when electrochemically reduced or oxidized.

In one non-limiting embodiment, the electrochromic composition 38 comprises a first compound and a second compound, including at least one anodic electrochromic compound and at least one cathodic electrochromic compound. The anodic electrochromic compound is an oxidizable material. The cathodic material is a reducible material. Upon application of electrical potential to the electrochromic composition 38, the anodic electrochromic compound oxidizes and the cathodic electrochromic compound simultaneously reduces. The simultaneous oxidation and reduction results in a change in the absorption coefficient at least one wavelength in the visible spectrum when electrochemically activated. The combination of an anodic electrochromic compound and a cathodic electrochromic compound in the electrochromic composition 38 defines the color associated therewith upon application of electrical potential across the first electrode 24 and the second electrode 30. Suitable anodic electrochromic materials for the electrochromic composition 38 comprises phenazine dyes. Suitable cathodic electrochromic materials for the electrochromic composition 38 comprises viologen dyes.

The electrochromic composition 38 can further comprise additional additives. The additional additive includes solvents, light absorbers, light stabilizers, thermal stabilizers, antioxidants, thickeners, viscosity modifiers, dyes, mixtures thereof, and combinations thereof. A dye incorporated into the electrochromic composition 38 defines the color of the electrochromic article 10. Such dyes are well-known in the art to color and/or to darken colors or shades as larger voltages are applied to the first electrode 24 and the second electrode 30. In one non-limiting embodiment of the invention, when a voltage is applied to the first electrode 24 and the second electrode 30, the electrochromic composition 38 colors and reduces the percent of visible light transmitted through the electrochromic composition 38. When the voltage applied to the first electrode 24 and second electrode 30 is turned off, the color of the electrochromic medium is bleached, resulting in an increase the percent of visible light transmitted through the electrochromic composition 38.

For purposes of the present invention, "transparent to visible light" or "transparent" means the total amount of visible light transmitted through an object, for example, and not limited to the invention, through one electrode assembly, or through one electrode assembly and the electrochromic medium, or through the two electrode assemblies and the electrochromic medium between the two electrode assemblies. The term "visible light" means electromagnetic radiation having a wavelength in the range 400-700 nanometers of the electromagnetic spectrum. The invention is not limited to the percent of visible light transmitted through the first substrate 12 and the first electrode 24, or the second substrate 18 and second electrode 30, or through the first substrate 12, first electrode 24, sealant material 36, and the electrochromic composition 38, or through the second substrate 18, second electrode 30, sealant material 36, and the electrochromic composition 38, or through the first substrate 12, first electrode 24, sealant material 36, second electrode 30, and second substrate 18 and the electrochromic composition 38 between the first 24 and second 30 electrodes of the electrochromic device 10 of the invention when the transparency is in the "off", "uncolored", or "bleached" state. In one non-limiting embodiment of the invention, visible light transmission is greater than 0%, e.g. greater than 30%, or greater than 45%, or greater than 60%. The visible light transmittance can measured by CIE standard illuminant A or other suitable standards.

Figure 2A:
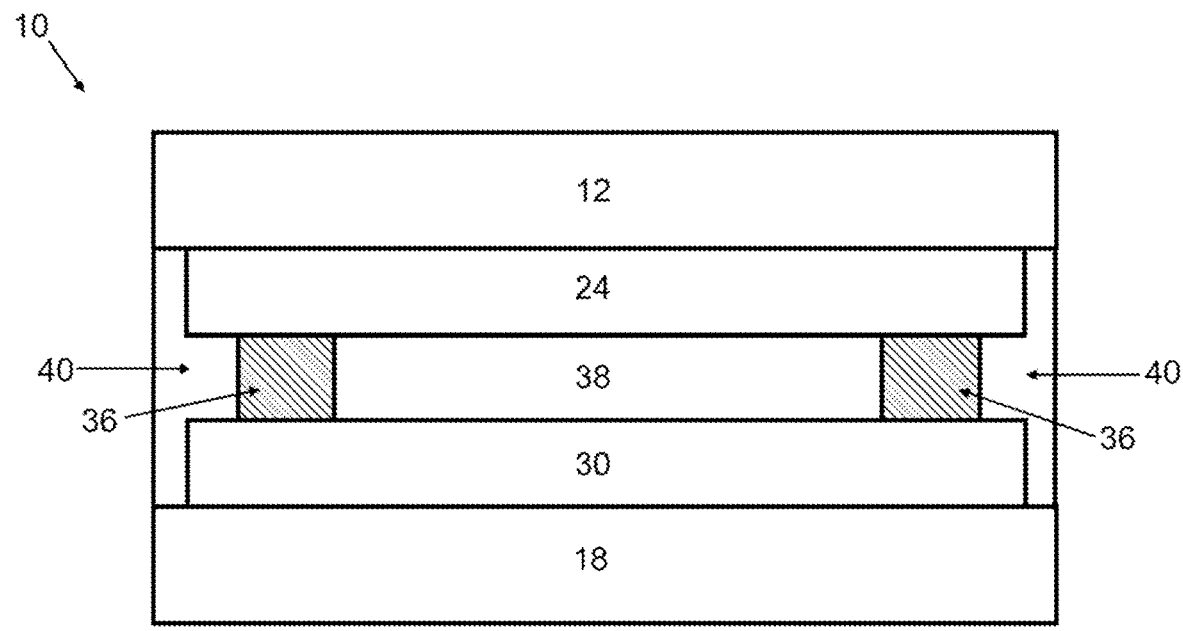
FIG. 2A is a sectional view (not to scale) of an electrochromic article according to an example of the invention.
Figure 2B:
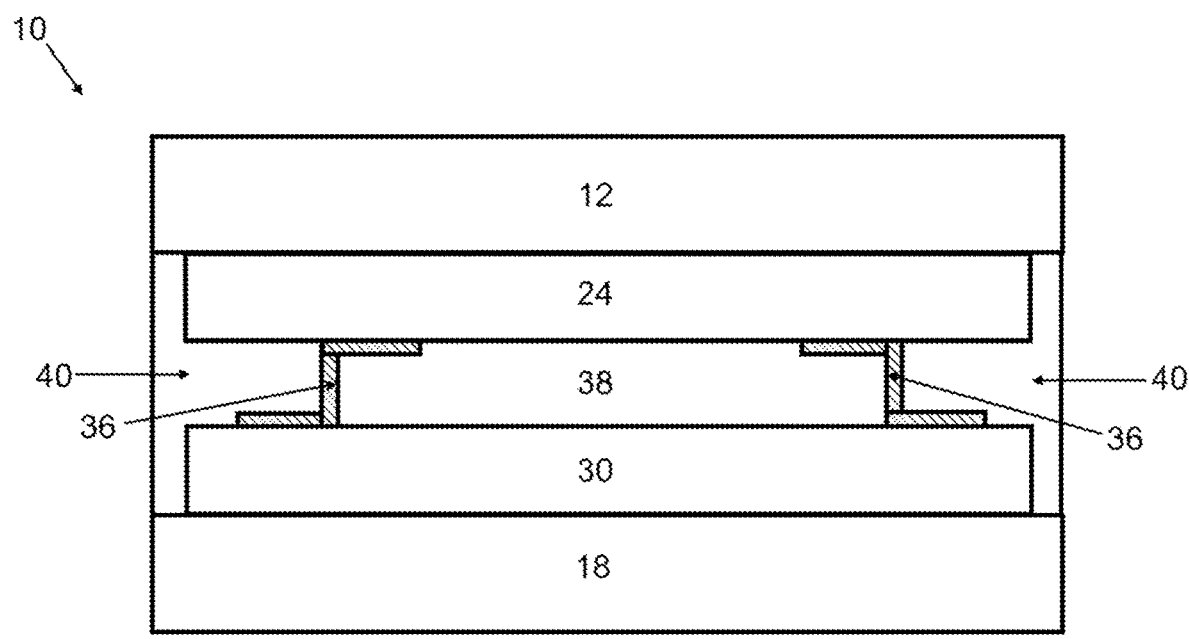
FIG. 2B is a sectional view (not to scale) of an electrochromic article according to an example of the invention.

The electrochromic article 10 can further comprise an optional interlayer material 40. The interlayer material 40 can be in direct contact with at least a portion of the first substrate 12, at least a portion of the first electrode 24, at least a portion of the sealant material 36, at least a portion of the second electrode 30, and at least a portion of the second substrate 18, as depicted in FIGS. 2A and 2B. The interlayer material 40 is not in contact with in the electrochromic composition 38. Non-limiting examples of suitable interlayer materials include polyvinyl butyral (PVB), ethylene-vinyl acetate (EVA), or polyisobutylene (FIB). In one non-limiting embodiment, the interlayer material 40 is PVB. The one or more connections (not shown) to the first electrode 24 from the external circuit (not shown) can extend through the sealant material 36 and interlayer material 40, when present. The one or more connections (not shown) to the second electrode 30 from the external circuit (not shown) can extend through the sealant material 36 and interlayer 40, when present.

The present invention is also related to a method of making an electrochromic article 10. The first substrate 12 having the first surface 14 and an opposite second surface 16 is provided. The first electrode 24 is positioned over at least a portion of the second surface 16 of the first substrate 12. The sealant material 36 is applied to be in direct contact with at least a portion of the first electrode 24. The electrochromic composition 38 is applied to be in direct contact with at least a portion of the first electrode 24 and in direct contact with at least a portion of the sealant material 36. The second substrate 18 having a third surface 20 and an opposite fourth surface 22 is provided. The second electrode 30 is positioned over at least a portion of the third surface 20 of the second substrate 18. The first substrate 12 having the first electrode 24, the sealant material 36, and the electrochromic composition 38 thereover is contacted with the second substrate 18 having the second electrode 30 thereover, such that the second electrode 30 is in direct contact with at least a portion of the sealant material 36 and at least a portion of the electrochromic composition 38. Sufficient pressure and heat is applied to form the electrochromic article 10.

The thickness of the sealant material 36 and the thickness of the electrochromic composition 38 defines the thickness between the first electrode 24 and the second electrode 30. The thickness of the sealant material 36 is selected such that the electrochromic composition 38 is simultaneously in direct contact with the first electrode 24 and the second electrode 30. The sealant material 36 can be a compressible material, such that the sealant material 36 can be reduced in thickness. The sealant material 36 can be a stretchable material, such that thickness of the sealant material 36 can be increased.

In some non-limiting embodiments, the sealant material 36 is applied at a thickness that is equal to the thickness of the electrochromic composition 38.

In some non-limiting embodiments, the sealant material 36 is applied at a thickness that is greater than the thickness of the electrochromic composition 38. In some non-limiting embodiments, the sealant material 36 is compressed to obtain a thickness equal to the electrochromic composition 38.

In some non-limiting embodiments, the sealant material 36 is applied at a thickness that is less than the thickness of the electrochromic composition 38. For example, when the sealant material 36 is applied in a step orientation as depicted in FIG. 1B or FIG. 2B, the thickness of the sealant material 36 can be less than the thickness of the electrochromic composition 38. In some non-limiting embodiments, when the thickness of the sealant material 36 is less than the thickness of the electrochromic composition 38, the electrochromic article 10 can have a gap with vacuum or inert gas between the electrochromic composition 38 and the sealant material 36.

The sealant material 36 is available as a pellets, sheets, or a liquid composition. The sealant material 36 can be applied to at least a portion of the second surface 28 of the first electrode 24 as a gasket, a sheet, extruded directly onto the first electrode 24, or deposited as a liquid. In one non-limiting embodiment the sealant material 36 is a gasket which can be formed by molding, extruding, or 3D-printing.

The sealant material 36 can be deposited as a liquid onto the first electrode 24 and/or the electrochromic composition 38 by brushing, flow through a nozzle, screen printing, and/or other printing techniques. The applied sealant material 36 can then be cured by heating or ultraviolet light to form a cross-linked sealant material 36.

In one non-limiting embodiment, the sealant material 36 is applied as a sheet or strip. The sealant material 36, when applied as a sheet or strip, overlaps at least a portion of the electrochromic composition 38. The sealant material 36 when applied as a sheet or strip can further comprise a transfer or backing tape. The transfer or backing tape is removed prior to contact with the second substrate 18 having the second electrode 30.

Figure 3:
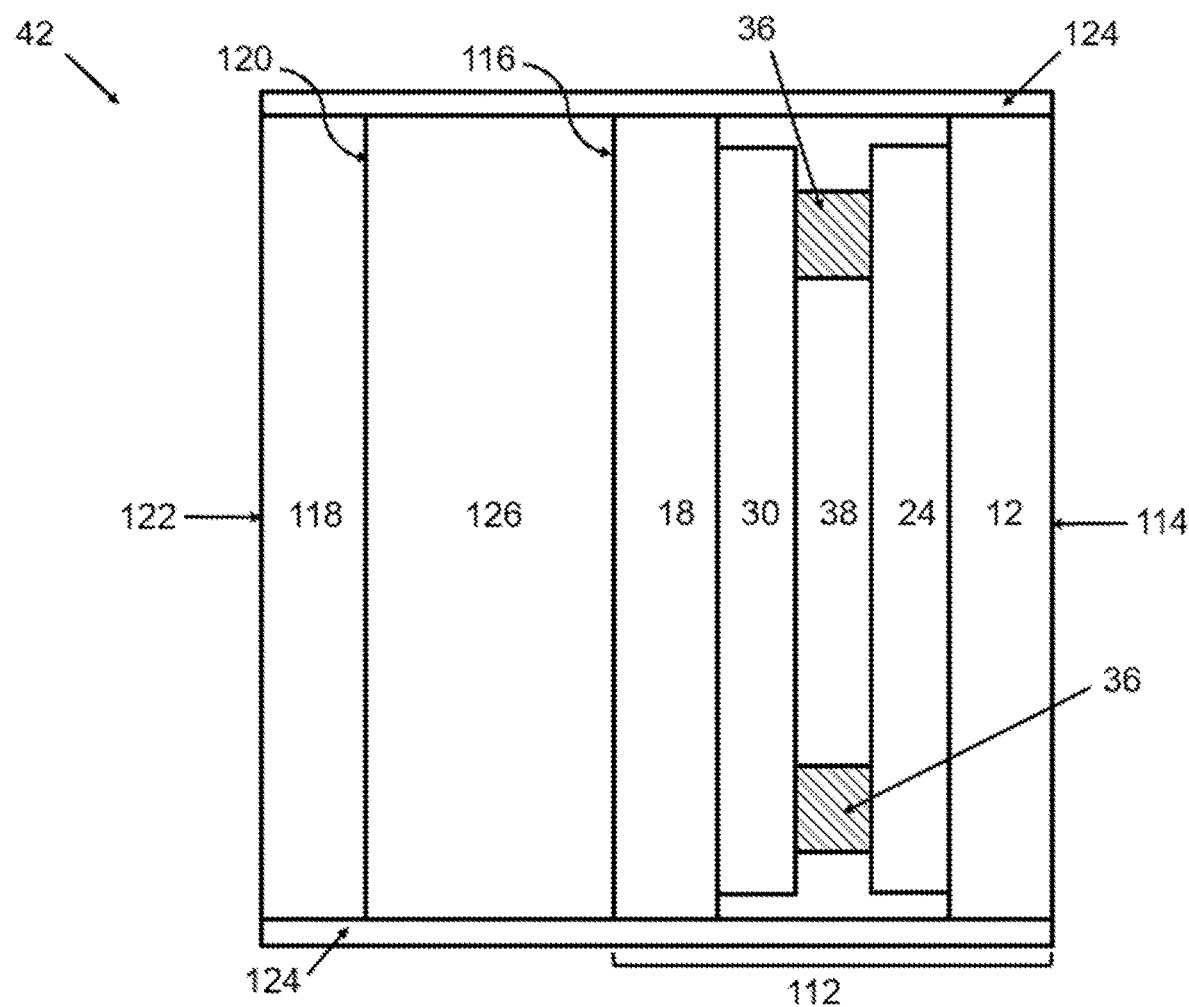
FIG. 3 is an insulating glass unit including an electrochromic article according to an example of the invention.

The present invention also relates to an insulating glass unit 42 comprising an electrochromic article. The invention relates to a dynamic component that may be used in an insulated glass unit. The insulated glass unit comprises a modified first ply which is the dynamic component. An exemplary insulating glass unit 42 of FIG. 3 is in the form of a conventional insulating glass unit comprising an electrochromic article. The insulating glass unit is formed from a first ply 112 and a second ply 118, where the first ply 112 and the second ply 118 are spaced apart. The first ply 112 as used herein with respect to the insulating glass unit is referred to as a modified first ply 112. The modified first ply 112 includes the electrochromic article according to the present invention and as described previously herein. Any embodiments of the electrochromic article previously described can be used as the modified first ply 112 for the present invention. The modified first ply 112 could be used as the inner ply or the outer ply. In one non-limiting embodiment, the modified first ply 112 is an outer ply. The insulated glass unit 42 includes the modified first ply 112 with a first major surface 114 (No. 1 surface) and an opposed second major surface 116 (No. 2 surface). In the illustrated non-limiting embodiment, the first major surface 114 faces the exterior of a building, i.e., is an outer major surface, and the second major surface 116 faces the interior of the building. The insulating glass unit 42 also includes a second ply 118 having an inner (first) major surface 120 (No. 3 surface) and an outer (second) major surface 122 (No. 4 surface). The insulated glass unit can further include a third ply with a first major surface (No. 5 surface) and an opposed second major surface (No. 6 surface). This numbering of the ply surfaces is in keeping with conventional practice in the art. In instances where there is more than two plies, the electrochromic article can be used to form the outer ply, the inner ply, the additional middle plies, or combinations thereof.

The first and second plies 112, 118 can be connected in any suitable manner, such as, by being adhesively bonded to a conventional spacer frame 124. A gap or chamber 126 is formed between the two plies 112, 118. The chamber 126 can be filled with a selected atmosphere, such as air, or a non-reactive gas such as argon or krypton gas. Examples of insulating glass units are found, for example, in U.S. Pat. Nos. 4,193,228; 4,464,874; 5,088,258; and 5,106,663.

The following numbered clauses are illustrative of various aspects of the invention:

Clause 1: An electrochromic article comprising: a first substrate having a first surface and an opposite second surface; a second substrate having a third surface and an opposite fourth surface separated from the first substrate with the second surface of the first substrate facing the third surface of the second substrate; a first electrode positioned over at least a portion of the second surface of the first substrate; a second electrode positioned over at least a portion of the third surface of the second substrate where the first electrode is separated from the second electrode; a sealant material positioned between the first electrode and second electrode; an electrochromic composition positioned in direct contact with at least a portion of the first electrode and at least a portion of the second electrode, wherein the sealant material is formed from an organic polymer material having an oxygen transmission rate (OTR) of less than or equal to 2 cubic centimeters per square meter day atmosphere ($cc/m^2 \cdot day \cdot atm$).

Clause 2: The electrochromic article of clause 1, wherein the organic polymer material comprises a (meth)acrylic, a polyurethane, a polyester, a polyolefin, polysiloxane, co-polymers thereof, or combinations thereof.

Clause 3: The electrochromic article of clauses 1 to 2, wherein the sealant material is in direct contact with the electrochromic composition.

Clause 4: The electrochromic article of any of the preceding clauses, wherein the sealant material is adjacent to the electrochromic composition.

Clause 5: The electrochromic article of any of the preceding clauses, wherein the sealant material surrounds the electrochromic composition.

Clause 6: The electrochromic article of any of the preceding clauses, wherein there is no additional material present between the sealant material and the electrochromic composition.

Clause 7: The electrochromic article of any of the preceding clauses, wherein the sealant material overlaps the electrochromic material.

Clause 8: The electrochromic article of any of the preceding clauses, wherein the sealant material is chemically inert with the electrochromic composition.

Clause 9: The electrochromic article of any of the preceding clauses, wherein the sealant material is resistant to degradation by ultraviolet light.

Clause 10: The electrochromic article of any of the preceding clauses, wherein the sealant material is not an epoxide-based organic polymer material.

Clause 11: The electrochromic article of any of the preceding clauses, wherein the sealant material is free of solvents.

Clause 12: The electrochromic article of any of the preceding clauses, wherein the electrochromic composition comprises an electrochromic solution, an electrochromic gel, an electrochromic semi-solid material, or an electrochromic solid material.

Clause 13: The electrochromic article of any of the preceding clauses, wherein the electrochromic composition comprises at least one anodic electrochemical compound and at least one cathodic electrochemical compound.

Clause 14: The electrochromic article of clause 13, wherein the at least one anodic electrochemical compound comprises a viologen dye.

Clause 15: The article of clause 13, wherein the at least one cathodic electrochemical compound comprises a phenazine dye.

Clause 16: The electrochromic article of any of clauses 12 to 15, wherein the electrochromic composition further comprises solvents, light absorbers, light stabilizers, thermal stabilizers, antioxidants, thickeners, viscosity modifiers, dyes, combinations thereof, or mixtures thereof.

Clause 17: The electrochromic article of any of the preceding clauses, wherein the first electrode comprises a first surface and a second surface.

Clause 18: The electrochromic article of clause 17, wherein the first surface of the first electrode is in direct contact with the second surface of the first substrate.

Clause 19: The electrochromic article of clauses 17 to 18, wherein the second surface of the first electrode is in direct contact with at least a portion of the sealant material and at least a portion of the electrochromic material.

Clause 20: The electrochromic article of clause 17, wherein the second electrode comprises a first surface and a second surface.

Clause 21: The electrochromic article of clause 20, wherein the first surface of the second electrode is in direct contact with at least a portion of the sealant material and at least a portion of the electrochromic material.

Clause 22: The electrochromic article of clauses 20 to 21, wherein the second surface of the second electrode is in direct contact with the third surface of the second substrate.

Clause 23: The electrochromic article of any of the preceding clauses, further comprising one or more connections to the first electrode and second electrode from one or more external circuits.

Clause 24: The electrochromic article of clause 23, wherein the one or more connections to the first electrode and second electrode extend through the sealant material.

Clause 25: The electrochromic article of clause NEW, wherein the one or more connections to the first electrode and second electrode does not extend through the sealant material.

Clause 26: The electrochromic article of any of the preceding clauses, wherein the first electrode and the second electrode comprise indium-doped tin oxide, fluorine-doped tin oxide, aluminum-doped zinc oxide, gallium-doped zinc oxide, indium-doped zinc oxide, doped silver, silver, titanium oxide, hafnium oxide, zirconium oxide, niobium oxide, zinc oxide, bismuth oxide, lead oxide, indium oxide, tin oxide, aluminum oxide, silicon oxide, mixtures thereof, or combinations thereof.

Clause 27: The electrochromic article of any of the preceding clauses, wherein the sealant material is in direct contact with at least a portion of the second surface of the first electrode, at least a portion of the electrochromic composition, and at least a portion of the first surface of the second electrode.

Clause 28: The electrochromic article of any of the preceding clauses, further comprising an interlayer material in direct contact with at least a portion of the first substrate, at least a portion of the first electrode, at least a portion of the sealant material, at least a portion of the second electrode, and at least a portion of the second substrate.

Clause 29: The electrochromic article of clause 28, wherein the interlayer material comprises polyvinyl butyral (PVB), ethylene-vinyl acetate (EVA), or polyisobutylene (FIB).

Clause 30: The electrochromic article of clause 2, wherein the organic polymer material is an (meth)acrylic-polyurethane copolymer.

Clause 31: The electrochromic article of clause 2, wherein the polyester is polyethylene terephthalate.

Clause 32: The electrochromic article of any of the preceding clauses, wherein the oxygen transmission rate is less than or equal to 1 $cc/m^2 \cdot day \cdot atm$.

Clause 33: The electrochromic article of any of the preceding clauses, wherein the oxygen transmission rate is less than or equal to 0.5 $cc/m^2 \cdot day \cdot atm$.

Clause 34: The electrochromic article of any of the preceding clauses, wherein there is a gap with vacuum or inert gas between the sealant material and the electrochromic composition.

Clause 35: An electrochromic article comprising: a first substrate having a first surface and an opposite second surface; a second substrate having a third surface and an opposite fourth surface separated from the first substrate with the second surface of the first substrate facing the third surface of the second substrate; a first electrode positioned over at least a portion of the second surface of the first substrate; a second electrode positioned over at least a portion of the third surface of the second substrate where the first electrode is separated from the second electrode; a sealant material positioned between the first electrode and second electrode; an electrochromic composition positioned in direct contact with at least a portion of the first electrode and at least a portion of the second electrode, wherein the sealant material is formed from an organic polymer material having an oxygen transmission rate (OTR) of less than or equal to 2 cubic centimeters per square meter day atmosphere ($cc/m^2 \cdot day \cdot atm$), and wherein the organic polymer material comprises a (meth)acrylic, a polyurethane, a polyester, a polyolefin, a polysiloxane, co-polymers thereof, or combinations thereof.

Clause 36: A method of preparing an electrochromic article, the method comprising: providing a first substrate having a first surface and an opposite second surface; positioning a first electrode over at least a portion of the second surface of the first substrate; applying a sealant material in direct contact with at least a portion of the first electrode; applying an electrochromic composition in direct contact with at least a portion of the first electrode and in direct contact with at least a portion of the sealant material; providing a second substrate having a third surface and an opposite fourth surface; positioning a second electrode over at least a portion of the third surface of the second substrate; contacting the first substrate comprising the first electrode, the sealant material, and the electrochromic composition with the second substrate comprising the second electrode such that the second electrode is in direct contact with at least a portion of the sealant material and at least a portion of the electrochromic material; providing a vacuum to evacuate the system or displace any oxygen or moisture with an inert gas; and heating to form an electrochromic article, wherein the sealant is formed from an organic polymer material having an oxygen transmission rate (OTR) of less than or equal to 2 cubic centimeters per square meter day atmosphere ($cc/m^2 \cdot day \cdot atm$).

Clause 37: The method of clause 36, wherein the sealant material in direct contact with the first electrode is applied in the shape of a frame.

Clause 38: The method of clause 37, wherein the electrochromic composition is applied inside the frame of sealant material.

Clause 39: The method of clauses 36 to 38, wherein sealant material comprises a thickness that is equal to the thickness of the electrochromic composition.

Clause 40: The method of clauses 36 to 39, wherein the sealant material is compressible.

Clause 41: The method of clauses 36 to 40, wherein the thickness of the sealant material and thickness of the electrochromic composition define the thickness between the first electrode and the second electrode.

Clause 42: The method of clauses 36 to 41, wherein the organic polymer material comprises a (meth)acrylic, a polyurethane, a polyester, a polyolefin, a polysiloxane, co-polymers thereof, or combinations thereof.

Clause 43: The method of clause 42, wherein the sealant material is in the form of pellets, a sheet, or a liquid.

Clause 44: The method of clauses to 36 to 43, wherein the sealant material is applied to at least a portion of the first electrode as a gasket, a sheet, extruded directly onto the first electrode, or deposited as a liquid.

Clause 45: The method of clause 44, wherein the gasket is formed by molding, extruding, or 3D-printing.

Clause 46: The method of clauses 43 to 44, wherein the sealant material deposited as a liquid is cured by heating or ultraviolet light.

Clause 47: The method of any of clauses 36 to 46, wherein the sealant material is adjacent to the electrochromic composition.

Clause 48: The method of any of clauses 36 to 47, wherein there is no additional material present between the sealant material and the electrochromic composition.

Clause 49: The method of any of clauses 36 to 48, wherein the sealant material overlaps the electrochromic material.

Clause 50: The method of clause 49, wherein the sealant material in direct contact with the first electrode is in the shape of a step.

Clause 51: The method of any of clauses 36 to 50, wherein the sealant material is chemically inert with the electrochromic composition.

Clause 52: The method of any of clauses 36 to 51, wherein the sealant material is resistant to degradation by ultraviolet light.

Clause 53: The method of any of clauses 36 to 52, wherein the sealant material is not an epoxide-based organic polymer material.

Clause 54: The method of any of clauses 36 to 53, wherein the sealant material is free of solvents.

Clause 55: The method of any of clauses 36 to 54, wherein the electrochromic composition comprises an electrochromic solution, an electrochromic gel, an electrochromic semi-solid material, or an electrochromic solid material.

Clause 56: The method of any of clauses 36 to 55, wherein the electrochromic composition comprises at least one anodic electrochemical compound and at least one cathodic electrochemical compound.

Clause 57: The method of clause 56, wherein the at least one anodic electrochemical compound comprises a viologen dye.

Clause 58: The method of clause 56, wherein the at least one cathodic electrochemical compound comprises a phenazine dye.

Clause 59: The method of any of clauses 36 to 58, wherein the electrochromic composition further comprises solvents, light absorbers, light stabilizers, thermal stabilizers, antioxidants, thickeners, viscosity modifiers, dyes, combinations thereof, or mixtures thereof.

Clause 60: The method of any of clauses 36 to 59, wherein the first electrode comprises a first surface and a second surface.

Clause 61: The method of clause 60, wherein the first surface of the first electrode is in direct contact with the second surface of the first substrate.

Clause 62: The method of clause 60, wherein the second surface of the first electrode is in direct contact with at least a portion of the sealant material and at least a portion of the electrochromic material.

Clause 63: The method of clause 60, wherein the second electrode comprises a first surface and a second surface.

Clause 64: The method of clause 63, wherein the first surface of the second electrode is in direct contact with at least a portion of the sealant material and at least a portion of the electrochromic material.

Clause 65: The method of clauses 63 to 64, wherein the second surface of the second electrode is in direct contact with the third surface of the second substrate.

Clause 66: The method of any of clauses 36 to 65, further comprising one or more connections to the first electrode and second electrode from one or more external circuits.

Clause 67: The method of clause 66, wherein the one or more connections to the first electrode and second electrode extend through the sealant material.

Clause 68: The method of clause 66, wherein the one or more connections to the first electrode and second electrode does not extend through the sealant material.

Clause 69: The method of any of clauses 36 to 68, wherein the first electrode and the second electrode comprise indium-doped tin oxide, fluorine-doped tin oxide, aluminum-doped zinc oxide, gallium-doped zinc oxide, indium-doped zinc oxide, doped silver, silver, titanium oxide, hafnium oxide, zirconium oxide, niobium oxide, zinc oxide, bismuth oxide, lead oxide, indium oxide, tin oxide, aluminum oxide, silicon oxide, mixtures thereof, or combinations thereof.

Clause 70: The method of any of clauses 36 to 69, wherein the sealant material is in direct contact with at least a portion of the second surface of the first electrode, at least a portion of the electrochromic composition, and at least a portion of the first surface of the second electrode.

Clause 71: The method of any of clauses 36 to 70, further comprising an interlayer material in direct contact with at least a portion of the first substrate, at least a portion of the first electrode, at least a portion of the sealant material, at least a portion of the second electrode, and at least a portion of the second substrate.

Clause 72: The method of clause 71, wherein the interlayer material comprises polyvinyl butyral (PVB), ethylene-vinyl acetate (EVA), or polyisobutylene (FIB).

Clause 73: The method of clause 42, wherein the organic polymer is a (meth)acrylic-polyurethane copolymer.

Clause 74: The method of clause 42, wherein the polyester is polyethylene terephthalate.

Clause 75: The method of clauses 36 to 74, wherein the oxygen transmission rate is less than or equal to 1 $cc/m^2 \cdot day \cdot atm$.

Clause 76: The method of clauses 36 to 74, wherein the oxygen transmission rate is less than or equal to 0.5 $cc/m^2 \cdot day \cdot atm$.

Clause 77: A method of preparing an electrochromic article, the method comprising: providing a first substrate having a first surface and an opposite second surface; positioning a first electrode over at least a portion of the second surface of the first substrate; applying a sealant material in direct contact with at least a portion of the first electrode; applying an electrochromic composition in direct contact with at least a portion of the first electrode and in direct contact with at least a portion of the sealant material; providing a second substrate having a third surface and an opposite fourth surface; positioning a second electrode over at least a portion of the third surface of the second substrate; contacting the first substrate comprising the first electrode, the sealant material, and the electrochromic composition with the second substrate comprising the second electrode such that the second electrode is in direct contact with at least a portion of the sealant material and at least a portion of the electrochromic material; providing a vacuum to evacuate the system or displace any oxygen or moisture with an inert gas; and heating to form an electrochromic article, wherein the sealant is formed from an organic polymer material having an oxygen transmission rate (OTR) of less than or equal to 2 cubic centimeters per square meter day atmosphere ($cc/m^2 \cdot day \cdot atm$), and wherein the organic polymer material comprises a (meth)acrylic, a polyurethane, a polyester, a polyolefin, a polysiloxane, co-polymers thereof, or combinations thereof.

Clause 78: An insulated glass unit comprising: a modified first ply formed of an electrochromic article comprising a first substrate having a first surface and an opposite second surface; a second substrate having a third surface and an opposite fourth surface separated from the first substrate with the second surface of the first substrate facing the third surface of the second substrate; a first electrode positioned over at least a portion of the second surface of the first substrate; a second electrode positioned over at least a portion of the third surface of the second substrate where the first electrode is separated from the second electrode; a sealant material positioned between the first electrode and second electrode; an electrochromic composition positioned in direct contact with at least a portion of the first electrode and at least a portion of the second electrode, wherein the sealant material is formed from an organic polymer material having an oxygen transmission rate (OTR) of less than or equal to 2 cubic centimeters per square meter day atmosphere (cc/m$^2$·day·atm); and a second ply comprising a No. 3 surface and a No. 4 surface, wherein the second ply is separated from the modified first ply and the modified first ply and the second ply are connected together.

Clause 79: The insulating glass unit of clause 78, wherein the organic polymer material comprises a (meth)acrylic, a polyurethane, a polyester, a polyolefin, polysiloxane, copolymers thereof, or combinations thereof.

Clause 80: The insulating glass unit of clauses 78 to 79, wherein the sealant material is in direct contact with the electrochromic composition.

Clause 81: The insulating glass unit of any of clauses 78 to 80, wherein the sealant material is adjacent to the electrochromic composition.

Clause 82: The insulating glass unit of clauses 78 to 81, wherein the sealant material surrounds the electrochromic composition.

Clause 83: The insulating glass unit of any of clauses 78 to 82, wherein there is no additional material present between the sealant material and the electrochromic composition.

Clause 84: The insulating glass unit of any of clauses 78 to 83, wherein the sealant material overlaps the electrochromic material.

Clause 85: The insulating glass unit of any of clauses 78 to 84, wherein the sealant material is chemically inert with the electrochromic composition.

Clause 86: The insulating glass unit of any of clauses 78 to 85, wherein the sealant material is resistant to degradation by ultraviolet light.

Clause 87: The insulating glass unit of any of clauses 78 to 86, wherein the sealant material is not an epoxide-based organic polymer material.

Clause 88: The insulating glass unit of clauses 78 to 87, wherein the sealant material is free of solvents.

Clause 89: The insulating glass unit of clauses 78 to 88, wherein the electrochromic composition comprises an electrochromic solution, an electrochromic gel, an electrochromic semi-solid material, or an electrochromic solid material.

Clause 90: The insulating glass unit of clauses 78 to 89, wherein the electrochromic composition comprises at least one anodic electrochemical compound and at least one cathodic electrochemical compound.

Clause 91: The insulating glass unit of clause 90, wherein the at least one anodic electrochemical compound comprises a viologen dye.

Clause 92: The insulating glass unit of clause 90, wherein the at least one cathodic electrochemical compound comprises a phenazine dye.

Clause 93: The insulating glass unit of clauses 78 to 92, wherein the electrochromic composition further comprises solvents, light absorbers, light stabilizers, thermal stabilizers, antioxidants, thickeners, viscosity modifiers, dyes, combinations thereof, or mixtures thereof.

Clause 94: The insulating glass unit of clauses 78 to 93, wherein the first electrode comprises a first surface and a second surface.

Clause 95: The insulating glass unit of clause 94, wherein the first surface of the first electrode is in direct contact with the second surface of the first substrate.

Clause 96: The insulating glass unit of clauses 94 to 95, wherein the second surface of the first electrode is in direct contact with at least a portion of the sealant material and at least a portion of the electrochromic material.

Clause 97: The insulating glass unit of any of clauses 78 to 93, wherein the second electrode comprises a first surface and a second surface.

Clause 98: The insulating glass unit of clause 97, wherein the first surface of the second electrode is in direct contact with at least a portion of the sealant material and at least a portion of the electrochromic material.

Clause 99: The insulating glass unit of clauses 97 to 98, wherein the second surface of the second electrode is in direct contact with the third surface of the second substrate.

Clause 100: The insulating glass unit of any of clauses 78 to 99, further comprising one or more connections to the first electrode and second electrode from one or more external circuits.

Clause 101: The insulating glass unit of clause 100, wherein the one or more connections to the first electrode and second electrode extend through the sealant material.

Clause 102: The insulating glass unit of clause 100, wherein the one or more connections to the first electrode and second electrode does not extend through the sealant material.

Clause 103: The insulating glass unit of any of clauses 78 to 102, wherein the first electrode and the second electrode comprise indium-doped tin oxide, fluorine-doped tin oxide, aluminum-doped zinc oxide, gallium-doped zinc oxide, indium-doped zinc oxide, doped silver, silver, titanium oxide, hafnium oxide, zirconium oxide, niobium oxide, zinc oxide, bismuth oxide, lead oxide, indium oxide, tin oxide, aluminum oxide, silicon oxide, mixtures thereof, or combinations thereof.

Clause 104: The insulating glass unit of any clauses 78 to 103, wherein the sealant material is in direct contact with at least a portion of the second surface of the first electrode, at least a portion of the electrochromic composition, and at least a portion of the first surface of the second electrode.

Clause 105: The insulating glass unit of any of clauses 78 to 104, further comprising an interlayer material in direct contact with at least a portion of the first substrate, at least a portion of the first electrode, at least a portion of the sealant material, at least a portion of the second electrode, and at least a portion of the second substrate.

Clause 106: The insulating glass unit of clause 105, wherein the interlayer material comprises polyvinyl butyral (PVB), ethylene-vinyl acetate (EVA), or polyisobutylene (FIB).

Clause 107: The insulating glass unit of clause 79, wherein the organic polymer material is an (meth)acrylic-polyurethane copolymer.

Clause 108: The insulating glass unit of clause 79, wherein the polyester is polyethylene terephthalate.

Clause 109: The insulating glass unit of any of clauses 78 to 108, wherein the oxygen transmission rate is less than or equal to 1 cc/m$^2$·day·atm.

Clause 110: The insulating glass unit of any of clauses 78 to 108, wherein the oxygen transmission rate is less than or equal to 0.5 cc/m²·day·atm.

Clause 111: The insulating glass unit of any of clauses 78 to 110, wherein there is a gap with vacuum or inert gas between the sealant material and the electrochromic composition.

Clause 112: An insulated glass unit comprising: a modified first ply formed of the article comprising a first substrate having a first surface and an opposite second surface; a second substrate having a third surface and an opposite fourth surface separated from the first substrate with the second surface of the first substrate facing the third surface of the second substrate; a first electrode positioned over at least a portion of the second surface of the first substrate; a second electrode positioned over at least a portion of the third surface of the second substrate where the first electrode is separated from the second electrode; a sealant material positioned between the first electrode and second electrode; an electrochromic composition positioned in direct contact with at least a portion of the first electrode and at least a portion of the second electrode, wherein the sealant material is formed from an organic polymer material having an oxygen transmission rate (OTR) of less than or equal to 2 cubic centimeters per square meter day atmosphere (cc/m²·day·atm), and wherein the organic polymer material comprises a (meth)acrylic, a polyurethane, a polyester, a polyolefin, polysiloxane, co-polymers thereof, or combinations thereof; and a second ply comprising a No. 3 surface and a No. 4 surface, wherein the second ply is separated from the modified first ply and the modified first ply and the second ply are connected together.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

The invention claimed is:

1. A method of preparing an electrochromic article, the method comprising:
   providing a first substrate having a first surface and an opposite second surface;
   positioning a first electrode over at least a portion of the second surface of the first substrate;
   applying a sealant material in direct contact with at least a portion of the first electrode;
   applying an electrochromic composition in direct contact with at least a portion of the first electrode and in direct contact with at least a portion of the sealant material;
   providing a second substrate having a third surface and an opposite fourth surface;
   positioning a second electrode over at least a portion of the third surface of the second substrate;
   contacting the first substrate comprising the first electrode, the sealant material, and the electrochromic composition with the second substrate comprising the second electrode such that the second electrode is in direct contact with at least a portion of the sealant material and at least a portion of the electrochromic material;
   providing a vacuum to evacuate the system or displace any oxygen or moisture with an inert gas; and
   heating to form the electrochromic article,
   wherein the sealant is formed from an organic polymer material having an oxygen transmission rate (OTR) of less than or equal to 2 cubic centimeters per square meter day atmosphere (cc/m²·day·atm),
   wherein said method further comprises providing an interlayer material in direct contact with, a portion of the opposite second surface of the first substrate, a portion of a second surface of the first electrode, at least a portion of the sealant material, a portion of a first surface of the second electrode, and a portion of the third surface of the second substrate, wherein the second surface of the first electrode and the first surface of the second electrode are in facing separated opposition to each other, and
   wherein the sealant material overlaps the electrochromic composition in a step orientation, wherein a portion of the sealant material is interposed between a portion of the second surface of the first electrode and a portion of the electrochromic composition, and a portion of the sealant material extends over a portion of the first surface of the second electrode.

2. The method of claim 1, wherein the sealant material in direct contact with the first electrode is applied in the shape of a frame, and
   wherein the electrochromic composition is applied inside the frame of sealant material.

3. The method of claim 2, wherein sealant material comprises a thickness that is equal to the thickness of the electrochromic composition.

4. The method of claim 3, wherein the thickness of the sealant material and thickness of the electrochromic composition define the thickness between the first electrode and the second electrode.

5. The method of claim 1, wherein the sealant material is in the form of pellets, sheets, or liquid, and
   wherein the sealant material is applied to at least a portion of the first electrode as a gasket, a sheet, extruded directly onto the first electrode, or deposited as a liquid.

6. The method of claim 1, wherein the interlayer material comprises polyvinyl butyral (PVB), ethylene-vinyl acetate (EVA), or polyisobutylene (PIB).

* * * * *